United States Patent [19]

McGuire

[11] 4,424,866

[45] Jan. 10, 1984

[54] METHOD FOR PRODUCTION OF HYDROCARBONS FROM HYDRATES

[75] Inventor: Patrick L. McGuire, Los Alamos, N. Mex.

[73] Assignee: The United States of America as represented by the United States Department of Energy, Washington, D.C.

[21] Appl. No.: 300,337

[22] Filed: Sep. 8, 1981

[51] Int. Cl.$^3$ ........................ E21B 43/24; E21B 43/26
[52] U.S. Cl. ................................... 166/303; 166/308; 166/371
[58] Field of Search ............... 166/271, 308, 369, 370, 166/371, 303; 252/8.55 R

[56] References Cited

U.S. PATENT DOCUMENTS

| | | | |
|---|---|---|---|
| 3,102,548 | 9/1963 | Smith et al. | 166/308 |
| 3,103,975 | 9/1963 | Hanson | 166/271 |
| 3,179,173 | 4/1965 | Jones, Jr. et al. | 166/308 X |
| 3,270,816 | 9/1966 | Staadt | 166/308 X |
| 4,265,311 | 5/1981 | Ely | 166/271 |

OTHER PUBLICATIONS

N. V. Cherskii et al., "Methods of Locating, Opening Up, and Exploiting Productive Horizons Containing Crystal Hydrates of Natural Gas, Physical and Engineering Problems of the North," Institute of Physical and Engineering Problems of the North, Academy of Sciences of the U.S.S.R., Siberian Division, Yakut Branch, Publishing House Nauka Novosibirsk, pp. 112–119, 1972, as translated by Associated Technical Services, Inc.

S. A. Arshinov et al., "Hydrate-Free Production of Wells in Messoyaksmi Gas Field," Gazovoe Delo, No. 12, 1971 (in Russian), as translated by H. Altmann, Jun. 1972.

P. A. Kolodeznyi et al., "Engineering the Pumping of Antihydrate Inhibitor into Wells of the Messoyakhskoe Field," Gazov. Delo, No. 11, pp. 9–11, 1970, as translated by Associated Technical Services, Inc.

Y. P. Korotaev et al., "Particulars of Investigating Gas Wells of the Far North in Relation to the Possibility of Hydrate Formation in the Bottom-Hole Zone of the Reservoir," Gazov. Prom., vol. 14, No. 5, pp. 12–15, 1969, as translated by Associated Technical Services, Inc.

N. L. Sheshukov et al., Gazovoe Delo, No. 6, pp. 8–10, 1972.

Gas Research Institute, Gas Hydrate Workshop, Denver, Colorado, pp. 39–44, Feb. 1, 1979.

W. J. Cieslewicz, "Some Technical Problems and Developments in Soviet Petroleum and Gas Production," The Mines Magazine, pp. 12–16, Nov. 1971.

C. Bily et al., "Naturally Occurring Gas Hydrates in the Mackenzie Delta, NWT," Bulletin of Canadian Petroleum Geology, vol. 22, No. 3, pp. 340–341 and 349, Sep. 1974.

"Gas Imprisoned in Permafrost," The Energy Daily, vol. 9, No. 115, p. 4.

F. Rakowsky et al., "Low-Temperature Electrolytes," Journal of the Electrochemical Society, vol. 10, No. 3, pp. 117–119, Mar. 1954.

Y. F. Makogon, "Hydrates of Natural Gas," Geoexplorers Associates, Inc., translated from Russian by W. J. Cieslewicz, Denver, Colorado, pp. 89–103, 1978.

Applied Engineered Stimulation, vol. II, Bryon Jackson, Inc., pp. 106–129, 138–141, and 170–179, 1972.

*Primary Examiner*—George A. Suchfield
*Attorney, Agent, or Firm*—William A. Eklund; Paul D. Gaetjens; Richard G. Besha

[57] ABSTRACT

A method of recovering natural gas entrapped in frozen subsurface gas hydrate formations in arctic regions. A hot supersaturated solution of $CaCl_2$ or $CaBr_2$, or a mixture thereof, is pumped under pressure down a wellbore and into a subsurface hydrate formation so as to hydrostatically fracture the formation. The $CaCl_2$/$CaBr_2$ solution dissolves the solid hydrates and thereby releases the gas entrapped therein. Additionally, the solution contains a polymeric viscosifier, which operates to maintain in suspension finely divided crystalline $CaCl_2$/$CaBr_2$ that precipitates from the supersaturated solution as it is cooled during injection into the formation.

5 Claims, No Drawings

METHOD FOR PRODUCTION OF HYDROCARBONS FROM HYDRATES

The invention is a result of a contract with the Department of Energy (Contract No. W-7405-ENG-36).

BACKGROUND OF THE INVENTION

This invention relates generally to a method for producing hydrocarbons from hydrocarbon-containing hydrates and relates more particularly to an economical method for such production.

Methane and other hydrocarbons are known to react with liquid water (or brine) or ice to form solid hydrocarbon hydrates. These compounds are believed to exist in very large quantities in Arctic regions in gas-bearing sediments which lie between about 1000 and a few thousand feet below the earth surface. Therefore, these hydrates represent an enormous potential resource of hydrocarbons.

The Russians in particular have been keenly interested in recovering hydrocarbons from these vast reserves. As outlined by W. J. Cieslewicz, in "Some Technical Problems and Developments in Soviet Petroleum and Gas Production," The Mines Magazine, November, 1971, on page 15, several different methods of converting hydrate gas back into the gaseous state directly in the formation which were under study by the date of that paper included (1) artificially reducing the formation pressure, (2) increasing the formation temperature, and (3) pumping of catalysts into the formation. Regarding the first of these methods, that method (according to the paper) can be used only in deposits with high permeability; and a very large pressure reduction is necessary, particularly in gas deposits containing heavier hydrocarbon components. Regarding the second of these methods, according to that paper, the method can be accomplished by pumping water, steam, or hot gases into the deposit. And, regarding the third of these methods, of the many chemical substances tried by the date of that paper, methanol produced the best results in bringing about the release of free gas from the hydrate.

By the early 1970's, as disclosed in a series of five Russian papers, the Russians suggested injecting pressurized materials into a gas-producing well located below an in situ hydrate zone in the Messoyakha field in order to prevent the formation of or to free the area around the well-bore from hydrates which form and plug the well. The Messoyakha field is unique in that it is the only known field that has located within the same reservoir a (lower) free gas zone and an (upper) hydrate zone. They proposed injecting hydrate inhibitors (e.g., methanol or ethylene glycol or calcium chloride solutions or mixtures thereof) into the reservoir by means of hydraulic fracturing. In N. V. Cherskii et al., "Methods of Locating, Opening Up, and Exploiting Productive Horizons Containing Crystal Hydrates of Natural Gas (On the Example of the Messoyakhskoe Field)," Institute of Physical and Engineering Problems of the North, Academy of Sciences of the USSR, Siberian Division, Yakut Branch, Publishing House "Nauka," Novosibirsk, 1972, pp. 112-119, (on page 6 of the translation by Associated Technical Services, Inc.) the following was stated: "The most effective method of preventing hydrate formation in the bottom-hole zone and destroying previously formed hydrates is to inject inhibitor (preferably methanol) into the reservoir by means of hydraulic fracturing. Forced injection of methanol into the bottom-hold zone of the productive formation of two wells of the Messoyakhskoe field gave a six-fold increase in production." The largest documented single treatment volume recited in any of the five articles was the injection of 1374 gallons (in a series of treatments with a cumulative volume of 5284 gallons in 100 days) of 25% by weight $CaCl_2$ solution into the free-gas zone of the Messoyakha field, as was described in S. A. Arshinov et al., "Hydrate-Free Production of Wells in Messoyakhsii Gas Field," Gazovoe Delo, No. 12, 1971, pp. 3-5 (at page 2 of the English translation by H. Altmann, June 1972). Such small volume treatments would be designed to dissolve hydrates occuring immediately adjacent to the well-bore and thus to perform near well-bore cleanup.

However, in a report issued by the Gas Research Institute covering a Gas Hydrate Workshop held in Denver, Colorado on February 1, 1979, at page 41 the statement was made that workers in some quarters felt that pressure reduction or the injection of alcohol or glycol probably would not prove viable for the recovery of natural gas from in situ hydrates for both technical and economic reasons; on the other hand, a more likely means was considered to be the injection of heat. Water (or brine) according to that report may be injected into the formation; and the hotter the water, the less will be required. Therefore, geothermal sources were a distinct possiblity.

The same article continued on page 43 that underground or in situ recovery of gas from hydrates should be environmentally acceptable, whereas mining—even if feasible—would be less so. For every molecule of methane in the hydrate form, 6, 7, or more molecules of water may occur; and this would present problems of dilution for solvent additives, as well as possible contamination of the waters remaining.

The article (on page 43) also considered the need for fracturing or rubblizing the hydrate-bearing formation, as an adjunct of production. The article pointed out that hydrate formations have little or no natural permeability and that techniques are needed to create flow channels in order to increase contact with the recovery agent. However, fracture by explosive or hydraulic methods was stated to be not regarded as a promising method of creating permeability. For explosive methods, (according to the article) the heat of explosion would liberate water which would be expected to refreeze unless temperatures could be sustained by the introduction of circulating water or gases. Hydraulic methods might be more satisfactory, according to the article, with the fracture sustained by sand particles. Thus, holding a crack open was still a goal.

And, as recently as June 16, 1981, in an article entitled, "Gas Imprisoned in Permafrost," Vol. 9, no. 115, in The Energy Daily, at page 4, the following conclusion regarding the effective stimulation of hydrate reservoirs was stated, "So far, no economic method has been devised for freeing the gas from its permafrost prison." Therefore, despite what has been known in the prior art, a need still exists for an economical method of producing hydrocarbons from hydrocarbon-containing hydrates.

SUMMARY OF THE INVENTION

An object of this invention is an economical method for producing hydrocarbons from hydrocarbon-containing hydrates.

Another object of this invention is a method of producing methane (or natural gas) at a fast rate, over an extended period of time, and in an economical and safe manner.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method of this invention comprises: producing hydrocarbons from a hydrate formation after a spearhead (described below) has been injected into the formation by (a) mixing a hot, "supersaturated" brine comprising: (1) water, (2) at least one salt selected from the group consisting of calcium chloride ($CaCl_2$), calcium bromide ($CaBr_2$), and mixtures thereof, and (3) at least one polymer viscosifier which is compatible with the salt(s) described above and which has a shear thinning rheology; and then (b) injecting a volume of at least about 10,000 gallons of that mixture at pressures of about 1 psi per foot of depth (below the earth surface) into a well-bore located within the hydrate formation, so as to produce a controlled, massive hydrofracture in the formation extending at least about 100 feet from the well-bore. The hot "supersaturated" brine will melt the hydrates and will release high-pressure gas, which in turn will help to extend the fracture even farther into the formation. Note that in this document the term "supersaturated" brine refers to a saturated or nearly saturated brine at elevated temperature which will become supersaturated as the hot brine starts to cool. A significant amount of excess salt will precipitate from the bring during cooling. Because as much salt as is practicable will be used, the high salt concentrations in the produced flow path (which will effectively be salt packs) will continue to melt hydrates for an extended period of time, even if the salts are diluted considerably, due to the properties of the particular chosen salt(s).

In a preferred embodiment, although the spearhead can be any of a variety of fluids the spearhead is preferably a hot brine of water and $CaCl_2$ and/or $CaBr_2$ having no undissolved salt and thus having a lower salt concentration than the mixture recited above. In the spearhead, there need be no viscosifier because no solids will be present.

Although salts have long been used to lower the melting point of ice, although they have been used to melt hydrates which have formed in pipelines, and although they have at least been proposed for use (together with methanol or ethylene glycol) to fracture in the area of a well-bore in order to maintain the gas production of a well which was located below (not in) a naturally occurring hydrate zone, it is believed that a hot brine has never previously been injected into a naturally occurring hydrate formation for the purpose of fracturing the formation and melting the hydrates in order to produce hydrocarbons. Additionally, although it has been suggested in several publications to inject hot, naturally occurring geothermal brines into hydrate deposits, these brines would not have the composition of the brines required in the present invention and these brines would be injected primarily for the benefit of their thermal energy, not their salt content. This injection would be a long-term process, not a one-time fracture stimulation (as usually used in the present invention).

It is believed that the particular brine fluids recited above have not previously been used for fracturing hydrates. In conventional hydraulic fracturing, large volumes of liquids under high pressures are pumped into a reservoir in order to create long fractures in the rock; and generally, a proppant material such as sand will be pumped into the fracture so that when the hydraulic pressure is released the sand will be trapped between the hard faces of the fracture and will keep the fracture open, providing a high-permeability flow path for the reservoir fluids. However, in the present invention, although not recognized (apparently) by others attempting to recover hydrocarbons from hydrates, in order to create a long high-premeability flow path it is required only that the hydrates be melted; and adding a proppant material such as sand is neither required nor desired. The fracture will have little or no permeability if hydrate or ice is allowed to reform, so the melting must continue for a relatively long time period. By the method of the invention, as the hydrates are merely melted, sand which is often present in hydrate formations will be permeable once the hydrates are melted. The produced hydrocarbon gases will easily flow through the permeable path thus produced. Although in the Gas Research Institute reference (cited above) hydraulic methods were mentioned for fracturing, the creation of a relatively permanent, high-permeability flow path merely by melting (as opposed to introducing proppant materials for sustaining a fracture) was clearly not addressed. And in the Russian literature, fracturing was mentioned in well-bore cleanup operations in free-gas zones, rather than for stimulating hydrate zones. It is believed that the method of the present invention is new and unobvious.

Although dense calcium chloride or calcium bromide brines with small amounts of polymer viscosifier have been used routinely as completion and workover fluids along the Gulf Coast and as low-invasion coring fluids for pressure coring, it is believed that the method of the invention of producing hydrocarbons by using such brines is patentably distinct from such work.

By using calcium chloride, or calcium bromide, or a mixture therof to prepare the slurry which is to be injected into the hydrate formation, several advantages arise. Both of these salts release much heat when they are dissolved in water due to the values of their heats of hydration. As the temperature of the solution increases, more of the salt can be dissolved and a very dense supersaturated solution can be obtained. Additionally, both of these materials form very low freezing point brines, as has been known in the art and as disclosed in the article by Rakowsky and Garret, "Low-Temperature Electrolytes," Journal of the Electrochemical Society, Vol. 10, No. 3, March, 1954, pp. 117-19. A brine made up of about 6.5 mole percent of calcium chloride has a freezing point of about $-67°$ F. (about $-55°$ C.); and a brine made up of about 7.2 mole percent of calcium bromide has a freezing temperature of about $-117°$ F. (about $-83°$ C.). And, furthermore, even if those recited concentrations are diluted considerably (as would occur during the melting of hydrates while hydrocarbons are produced in the formation in the method of the invention), a brine of calcium bromide having about 2 mole percent salt and a brine of calcium chloride having about 3 mole percent salt will both have a freezing temperature of about 10° F. Because the temperatures in most hydrate formations will not drop lower than about 10° F., brines having concentrations of salts of calcium bromide greater than about 2 mole percent calcium bromide or a calcium chloride brine having a mole percent greater than about 3 mole percent calcium chloride will be satisfactory for use in the invention. These figures were obtained form a graph displayed in the Rakowsky and Garrett reference cited above; and that graph is hereby incorporated herein by reference.

Yet another advantage of these two salts for use in the invention is that they are both quite economical. The cost of the salt and its transportation to the production site represent the only expected significant costs which should arise in the practice of the invention. The equipment used to mix the fluids and to pump them into the well is routinely used by the oil industry and is readily available. The invention, therefore, is expected to provide an economical method for producing hydrocarbons from naturally occurring hydrate reservoirs.

Additionally, another advantage of using the salts recited above (unlike materials such as methanol which have been tried in the prior art) is that the salts are safe to use, are not flammable, and will tend to stay in place in the reservoir and will not merely flow out of the reservoir.

Yet another advantage is that although these salts are very corrosive at high temperatures, there is no significant corrosion at temperatures below 32° F.

A further advantage is that once the fracture is initially opened, as the hydrate decomposes, its structure will change (e.g., the hydrate will form water and free gas); and the gas which has formed will help to extend the crack. Additionally, the method will be self-driven, once the slurry has been introduced into the formation; the heat of hydration will continue to provide heat for melting as more of the hydrate dissolves.

DESCRIPTION OF THE PREFERRED EMBODIMENTS

In the practice of the invention, either calcium chloride or calcium bromide or a mixture thereof can be used to form the slurry which is to be injected into the hydrate formation after the spearhead is injected. The salt will be used in amounts which are as large as practicable.

Also required in the practice of the invention is at least one viscosifier which is chemically compatible with the dense brines with which it is to be mixed. The viscosifier should have desirable rheological properties, including non-Newtonian shear thinning behavior and good proppant-suspension properties. Examples of suitable viscosifiers include hydroxyethyl cellulose (i.e., HEC) and xanthum gum (i.e., XC), which are water soluble, easily pumpable, and able to suspend large quantities of salt.

The viscosifier should be used in sufficient amounts to prevent the salt from settling too quickly and possibly causing a "screen-out" (in which the proppant fills in the well-bore and plugs it up, rather than being carried out into the fracture).

The spearhead can be any of a variety of fluids, and there need be no viscosifier in the spearhead. However, it is preferred to use a hot brine of water and $CaCl_2$ and/or $CaBr_2$, due to the properties of these salts (described above). The spearhead will be injected into the well in a volume of about 1000 gallons at an initial pressure sufficient to begin a fracture in the formation (i.e., about 1 psi per foot of depth of the formation below the earth surface). After the fracture has begun, the fluid pressure needed to continue the fracture decreases for a period of time and then increases.

The slurry or dense brine will be produced in the following way. First, water and some of the salt will be mixed together, resulting in a hot solution (having a temperature as high as about 150°-200° F.). Due to the high temperatures, large quantities of additional salt can be dissolved in the fluid. Then, polymer viscosifier will be added, along with more salt. The concentration of the final mixture will be in excess of about 10 mole percent salt and in excess of about 1 lb of viscosifier per barrel of brine; and the mixture will be needed in volumes of at least about 10,000 gallons.

If desired, other ingredient(s) can be present in the mixture in a total small amount (for example, 5–20 weight percent). Such additives can include, for example, alcohol(s) and/or glycol(s) and/or additional amounts of other salts(s). These can be present with the mixture of water, $CaCl_2$ and/or $CaBr_2$, and viscosifier, provided that the ingredients are all chemically compatible with one another.

Then, the hot, supersaturated salt slurry will be pumped at high rates (preferably at least about 100 gallons/min.) into the hydrate zone, creating a long fracture that is packed with salt (with additional salt dropping out of solution as the mixture cools). Additionally, if desired, more salt can be added to the fracture so as to produce a salt pack which will remain for long periods of time (on the order of many days) in the fracture. Even if the salt forms a solid wedge within the fracture, the melting will still proceed and the production of hydrates will continue. This is a significant difference from conventional fracturing, where the presence of a solid wedge (such as ice or hydrate-plugged sand) would terminate the production of a well. In this invention, therefore, salt storage for prolonged prevention of freezing is intended, rather than to use the salt as a proppant. Thus, this goal of this invention is very different from the goals of the prior art addressed above.

It is believed that the method of this invention will be useful with most types of hydrate formations which will be encountered. However, because the dissociation pressures will decrease as the content of heavier hydrocarbons in a hydrate formation become higher, there could be some combination of temperature and pressure at which the method might not work well. For example, if the propane content in the hydrates were too high, the pressure might not be high enough to drive the produced propane-rich gas to the well.

Generally, the pipe and packer assembly will be removed after the slurry has been introduced into the formation; and then other equipment will be inserted for removing the produced fluids and hydrocarbon gases. Alternatively, if desired, the same pipe could be used to remove the produced gases.

It will not be necessary to move the position of the pipe during production because the high pressures of the produced hydrocarbon gases will move the gases into the pipe.

As is standard procedure in well production, the pressure around the well must be lowered in order to produce the product gases. This can be done by any suitable means.

In order to fracture the hydrate and to provide a path length of at least about 100 feet (which is believed to be required for economic production of hydrocarbons), the slurry should be pumped into the formation at an initial pressure which would at least be high enough to fracture the reservoir (i.e., about 1 psi per foot of depth below the earth surface).

The volume of slurry which should be used should be at least about 10,000 gallons. This is roughly an order of magnitude greater than the largest single treatment volume of inhibitor which was stated as having been used by the Russians in the Messoyakha field (as described in the Arshinov et al. article, cited above). This is also roughly an order of magnitude greater than the volume of methanol which was injected by Imperial Oil Limited in the Mackenzie Delta of Canada (as described in C. Bily et al., "Naturally Occurring Gas Hydrates in the Mackenzie Delta, N.W.T.," Bulletin of Canadian Petroleum Geology, vol. 22, No. 3 (September, 1974) at page 349. And in the present invention volumes up to several hundred thousand gallons will preferably be used.

Although the salt itself may not form a permeable salt pack within the fracture, it is believed that the method of production of the invention will still be operable even if a nonpermeable salt pack occurs.

The foregoing description of preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. This description sets forth the best mode presently contemplated for the practice of the invention. It is intended that the scope of the invention be defined by the claims appended hereto.

What is claimed is:

1. A method of producing hydrocarbons from a hydrate formation after a spearhead as been injected into the formation, said method comprising:
   (a) mixing a hot, "supersaturated" mixture comprising:
      (1) water;
      (2) salt selected from the group consisting of calcium chloride ($CaCl_2$), calcium bromide ($CaBr_2$), and mixtures thereof; and
      (3) at least one polymer viscosifier which is compatible with said salt and which has a shear thinning rheology; and then
   (b) injecting a volume of at least about 10,000 gallons of said mixture and at a pressure of at least about 1 psi per foot of depth of said formation below the earth surface into a well-bore having perforations located within a hydrate formation, so as to produce a controlled, massive hydrofracture in the formation extending at least about one hundred feet from said well-bore.

2. A method according to claim 1, wherein said volume of said mixture is within the range from at least about 10,000 gallons to several hundred thousand gallons and wherein said spearhead comprises a brine comprising water and at least one salt selected from the group consisting of $CaCl_2$, $CaBr_2$, and mixtures thereof.

3. A method according to claim 2 and including also the step of adding additional amounts of salt to said mixture after an initial portion of said mixture has been introduced into said hydrate formation.

4. A method according to claim 3, wherein said hydrate upon reduction of pressure dissociates essentially into water and/or ice and a gas selected from the group consisting of methane, ethane, propane, and mixtures thereof.

5. A method according to claim 1 or claim 3, wherein said mixture is mixed immediately prior to injecting said mixture into said hydrate formation so as to utilize the heat of hydration of the salt in order to heat said hydrates.

* * * * *